United States Patent
Odle et al.

(10) Patent No.: US 8,426,533 B2
(45) Date of Patent: Apr. 23, 2013

(54) PROCESS FOR CONTROLLING REACTION STOICHIOMETRY DURING POLYMERIZATION OF THERMOPLASTIC RESINS

(75) Inventors: Roy Ray Odle, Mt. Vernon, IN (US); Vijay Gopalakrishnan, Evansville, IN (US); Narayan Ramesh, Evansville, IN (US); Albert Santo Stella, Voorheesville, NY (US); Lioba Maria Kloppenburg, Mount Vernon, IN (US); David Bruce Hall, Ballston Lake, NY (US)

(73) Assignee: SABIC Innovative Plastics IP B.V. (NL)

( * ) Notice: Subject to any disclaimer, the term of this patent is extended or adjusted under 35 U.S.C. 154(b) by 334 days.

(21) Appl. No.: 12/339,987

(22) Filed: Dec. 19, 2008

(65) Prior Publication Data

US 2010/0160578 A1 Jun. 24, 2010

(51) Int. Cl.
*C08G 85/00* (2006.01)
*C08G 73/10* (2006.01)

(52) U.S. Cl.
USPC .............................. 526/60; 528/353; 528/272

(58) Field of Classification Search ..................... 526/60
See application file for complete search history.

(56) References Cited

U.S. PATENT DOCUMENTS 7,041,773 B2 * 5/2006 Gallucci et al. ............... 528/170

* cited by examiner

*Primary Examiner* — Randy Gulakowski
*Assistant Examiner* — Rachel Kahn (57) ABSTRACT

The present invention provides a process for measuring and controlling chemical reactions that produce thermoplastic polymers by utilizing a stoichiometry correction during a reaction cycle to produce thermoplastic resins with desired properties. The thermoplastic polymer is made from at least one first monomer having a first reactive end group and at least one second monomer having a second reactive end group by reaction of the first reactive end group with the second reactive end group and has a glass transition temperature of greater than 130° C.

26 Claims, 1 Drawing Sheet

PROCESS FOR CONTROLLING REACTION STOICHIOMETRY DURING POLYMERIZATION OF THERMOPLASTIC RESINS

FIELD OF INVENTION

The present invention relates generally to the field of measuring and controlling chemical reactions such as processes for producing thermoplastic resins and, more particularly, to processes for stoichiometry correction during a reaction cycle to produce thermoplastic resins with the desired properties.

BACKGROUND OF THE INVENTION

Polyimides, including polyimide sulfone and polyetherimide sulfone resins, are known to be useful high performance polymers. A desired process for producing polyimide sulfone resins through a heterogeneous process is disclosed in U.S. Pat. No. 7,041,773 B2 to Gallucci et al., which results in resins having a total reactive end group concentration of less than about 120 milliequivalents/kilogram (meq/kg) resin. The polyimide sulfones may be made in a solvent process. Typically, polymerization in a solvent takes place at temperatures of about 100° C. to about 250° C. Solvents with a boiling point of greater than about 150° C. at atmospheric pressure are used allowing the polymerization reaction to be carried out at higher temperature which improves the reaction rate. The higher temperature also typically allows the polymer to remain partially in solution, thus facilitating the build of higher molecular weight. Higher molecular weight polymer often gives better mechanical properties in articles formed from polyimide sulfone resins.

To control the stoichiometry to produce desired reactive end group concentration in the final resin, the concentration of end groups on the polyimide sulfone product is measured in the reaction mixture at various times during synthesis of the polyimide sulfone. For example, the concentration of end groups can, be measured at a specific time, or when the polymer has been determined to have reached some molecular weight or viscosity target, or when the water being removed from the reaction is observed to diminish or essentially stop. If the analysis shows that the total concentration of reactive end groups is greater than 120 meq/kg, then at least one of aromatic diamine monomer or aromatic dianhydride monomer or primary monoamine capping agent or aromatic dicarboxylic acid anhydride capping agent may be added to the reaction mixture to reduce the total concentration of reactive end groups to 120 meq/kg or less and in the appropriate amount to provide the desired molecular weight of the polymer. The steps of analyzing the polymer in the reaction mixture for end group concentration and optionally adding an amount of at least one of monomers or capping agents to the reaction mixture to reduce reactive end group concentration may be performed as many times as necessary to provide a reactive end group concentration at or below 120 meq/kg in the final polymer product and achieve the desired molecular weight.

While the process described produces the desired result, the type of material and amount of material to be added during the reaction is determined by direct measurement of reactive end groups in solution by using a sample that can be totally dissolved in solvent to facilitate direct reactive end group measurement. The process time may need to be extended to allow for further correction if the incorrect material or incorrect amount of material is added. Continuing correction is needed until the desired product is obtained. Further, an error in judgment as to what and how much to add to the reaction may result in the process producing an undesired product. In the heterogeneous case or a case where the sample cannot be dissolved, the error is compounded by the partitioning of reactive species (monomers, oligomers and polymers) in various phases of solid and solvent. Thus, there remains a need to develop a process with more precision such that the addition of materials to correct stoichiometry of the polymerization reaction produces the desired results without speculation. It is to the provision of such that the present invention is primarily directed.

SUMMARY OF THE INVENTION

A process for preparing a thermoplastic polymer to achieve a predetermined polymer target stoichiometry, wherein a thermoplastic polymer is made from at least one first monomer having a first reactive end group and at least one second monomer having a second reactive end group by reaction of the first reactive end group with the second reactive end group and has a glass transition temperature, Tg, of greater than 130° C., comprises the steps of:

(a) selecting a polymer target stoichiometry, $S_T$, based on a target incorporated part-moles of a first reactive end group of at least one first monomer, $A_T$, and a target incorporated part-moles of a second reactive end group of at least one second monomer, $B_T$, wherein the target can be expressed on the basis of monomer $B_T$ as:

$$S_T = [A_T/B_T] - 1; \text{ (which can be rearranged from } S_T = [A_T - B_T]/B_T)$$

(b) calculating an initial polymer formulation stoichiometry, $S_I$, by determining an offset factor, $\lambda$, and calculating the polymer formulation stoichiometry based on the following formula:

$$S_I - S_T = \lambda, \text{ or rearranging to:}$$

$$S_I = S_T + \lambda,$$

wherein the offset factor is determined by experimentally determining an amount of a member selected from the group consisting of unreacted first monomers, unreacted second monomers, and combinations thereof, of a calibration sample thermoplastic polymer made by reacting the at least one first monomer and the at least one second monomer;

(c) determining part-moles of the first reactive end group of the at least one first monomer to be initially charged to a reactor, $A_I$, and part-moles of the second reactive end group of the at least one second monomer to be initially charged to the reactor, $B_I$, based on the following formula:

$$S_I = [A_I/B_I] - 1;$$

(d) reacting an amount of the at least one first monomer and an amount of the at least one second monomer as determined from step (c) in the reactor containing at least one organic solvent and forming a reaction mixture having solids in an amount that is more than 5 weight percent, based on the weight of the reaction mixture;

(e) obtaining a sample from the reaction mixture after a period of time sufficient to allow for reaction of the at least one first monomer and the at least one second monomer to form the thermoplastic polymer;

(f) separating the sample into a soluble phase and an insoluble phase comprising the thermoplastic polymer;

(g) determining a first reactive end group concentration of the at least one first monomer in the thermoplastic polymer as measured in part-moles ($A_R$), a second reactive end group concentration of the at least one second monomer in the thermoplastic polymer as measured in part-moles ($B_R$), a first reactive end group concentration of the at least one first monomer in the soluble phase as measured in part-moles ($X_R$), and a second reactive end group concentration of the at least one second monomer in the soluble phase as measured in part-moles ($Y_R$);

(h) determining a reaction stoichiometry for the sample, $S_R$, based on the following formula:

$$S_R = [A_R/B_R] - 1;$$

(i) determining a value of $S_T - S_R$;
(j) selecting from
  (i) if $S_T - S_R \leq 0$, adding to the reaction an amount of part-moles of the second reactive end group of the at least one second monomer (for correction of stoichiometry), based on the following formula:

$$B_C = \alpha * B_I \left( \frac{1 + S_R}{1 + S_T} - 1 \right) + \beta * X_R,$$

wherein $B_C$ is part-moles of the second reactive end group of the at least one second monomer for addition to the reaction, $B_I$ is the part-moles of the second reactive end group of the at least one second monomer initially charged to the reactor, $S_R$ is the reaction stoichiometry for the sample, $S_T$ is the polymer target stoichiometry, $X_R$ is part-moles of the first reactive end group of the at least one first monomer in the soluble phase of the sample, α is constant ranging from 1 to 20; β is a constant ranging from 0 to 1; or (ii) if $S_T - S_R > 0$, adding to the reaction an amount of part-moles of the first reactive end group of the at least one first monomer (for correction of stoichiometry), based on the following formula:

$$A_C = B_I * \delta(S_T - S_R) + \epsilon Y_R$$

wherein $A_C$ is the part-moles of the first reactive end group of the at least one first monomer for addition to the reaction, $B_I$ is the part-moles of the second reactive end group of the at least one second monomer initially charged to the reactor, $S_R$ is the reaction stoichiometry for the sample, $S_T$ is the polymer target stoichiometry, $Y_R$ is the part-moles of second reactive end group of the at least one second monomer in the soluble phase of the sample, δ is a constant ranging from 1 to 20, and δ is a constant ranging from 0 to 1; and;

(k) forming the thermoplastic polymer with a final stoichiometry, $S_F$.

The process as described produces thermoplastic polymer at the desired stoichiometry $S_T$ and, thus, the desired molecular weight.

In another embodiment of the present invention the process above is used to prepare polyimide sulfone resin or polyetherimide sulfone resin, the first reactive end group of at least one first monomer is anhydride groups from dianhydride monomer, the second reactive end group of at least one second monomer is amine groups from aromatic diamine monomer, and at least one of the monomers comprises a sulfone linkage.

DETAILED DESCRIPTION OF THE INVENTION

The present invention is directed to a process for preparing a thermoplastic polymer by correcting for stoichiometry variations occurring during the reaction so that a predetermined polymer target stoichiometry may be achieved. The process is particularly helpful in determining useful formulations that are suitable for making polymers with predetermined polymer target stoichiometries. The thermoplastic polymer is one that contains at least two monomers, i.e. at least one first monomer having a first reactive end group and at least one second monomer having a second reactive end group, and has a Tg of greater than 130° C. The thermoplastic polymer is preferably selected from polyimides, polyetherimides, polysulfones, polyesters, polybenzoxazoles, polyamides, polybenzimidazoles and combinations thereof. More preferably, the polymer is a polyetherimide wherein the first reactive end group of the at least one first monomer is an anhydride group of an aromatic dianhydride monomer and the second reactive end group of the at least second first monomer is an amine group of an aromatic diamine monomer. Even more preferably, the polymer is a polyetherimide sulfone having a glass transition temperature of from about 200 to about 350° C., a residual volatile species concentration of less than about 500 ppm and a reactive end group concentration of less than or equal to the polymer target stoichiometry. When the polymer is a polysulfone, preferably the at least one first monomer is a dihalodiphenylsulfone and the at least one second monomer is a bisphenol. When the thermoplastic polymer is a polyester, preferably the at least one first monomer is a diacid (or a functionally equivalent diester) and the at least one second monomer is a diol.

The process begins by selecting a polymer target stoichiometry, $S_T$, that is based on target incorporated part-moles of a first reactive end group of at least one first monomer, $A_T$, and a target incorporated part-moles of a second reactive end group of at least one second monomer, $B_T$. This may be calculated based on the following formula: $S_T = [A_T/B_T] - 1$. An initial polymer formulation stoichiometry, $S_I$, is calculated by first determining an offset factor (or overcharge factor, correction factor), λ, and then calculating the polymer formulation stoichiometry based on the following formula: $S_I = S_T + \lambda$.

λ represents the offset factor (or overcharge factor, correction factor) of the initial polymer formulation stoichiometry, $S_I$, from the target stoichiometry, $S_T$, that enables the user of the process to produce a polymer having a final stoichiometry, $S_F$, which matches a target stoichiometry, $S_T$.

Since not all of the monomers in a system react during polymerization, it is advantageous to determine λ. The skilled artisan will appreciate that in heterogeneous polymerization conditions one of the factors that results in the solid phase having a final stoichiometry, $S_F$, different from the initial polymer formulation stoichiometry $S_I$ is a segregation of the constituent reactants between the liquid phase and the solid phase that forms. Accordingly, because the compositions of these phases can be different, the stoichiometry of the solid phase polymer is not necessarily the same stoichiometry as the initial charge stoichiometry. Although λ is suitably practiced for heterogenous conditions, it is understood that it can also be calculated for homogenous polymerization conditions.

Prior to calculating an initial polymer target stoichiometry, $S_T$, $\lambda$ is ordinarily determined by experimentally observing the amount of monomers that remain unreacted in a calibration sample thermoplastic polymer that is made by reacting a first monomer and a second monomer. The offset factor is intended to compensate the unreacted monomers present in the calibration sample thermoplastic polymer (unreacted monomers that would otherwise create a polymer with undesired stoichiometry properties), thereby enabling the user of our process to identify optimal amounts of monomers that create conditions which facilitate the formation of the desired stoichiometry.

$\lambda$ can be determined by any suitable means. In one embodiment, $\lambda$ is determined experimentally by performing a set of heterogeneous polymerization experiments to determine the value that results in the initial charge stoichiometry, $S_I$, that will produce a polymer with a final stoichiometry, $S_F$, that is within a specified tolerance of the target stoichiometry $S_T$. A set of heterogeneous polymerizations can be performed such that the initial charge stoichiometry, $S_I$, is varied over a specified range. This range can be determined by adding incremental amounts of one of the reactive monomers such that $S_I$ is greater than $S_T$ by a value $\lambda_j$, where j denotes the value for a particular experiment in the set of experiments performed. Heterogeneous polymers with a discrete set of final stoichiometries, $S_{Fj}$, (where the subscript $j$ denotes the result obtained for a specific experiment) are made with corresponding initial charge stoichiometries ($S_{Ij}$), in accordance with the following formula:

$$S_{Ij} = S_T + \lambda_j$$

A plot of $S_{Fj}$ (y-axis) vs. $S_{Ij}$ (x-axis) can then be made, and a correlation can be developed between $S_{Fj}$ and $S_{Ij}$. The value of $S_{Ij}$ that gives $S_{Fj}=S_T$ is then determined from the correlation. Then the $\lambda_j$ that corresponds to this $S_{Ij}$ is determined from the above equation by subtracting $S_T$ from this value of $S_{Ij}$. This $\lambda_j$ is the value $\lambda$. The specified tolerance of the target stoichiometry $S_T$ is determined by the user of the process and is an acceptable experimental error, e.g., ±5%.

Figure 1:
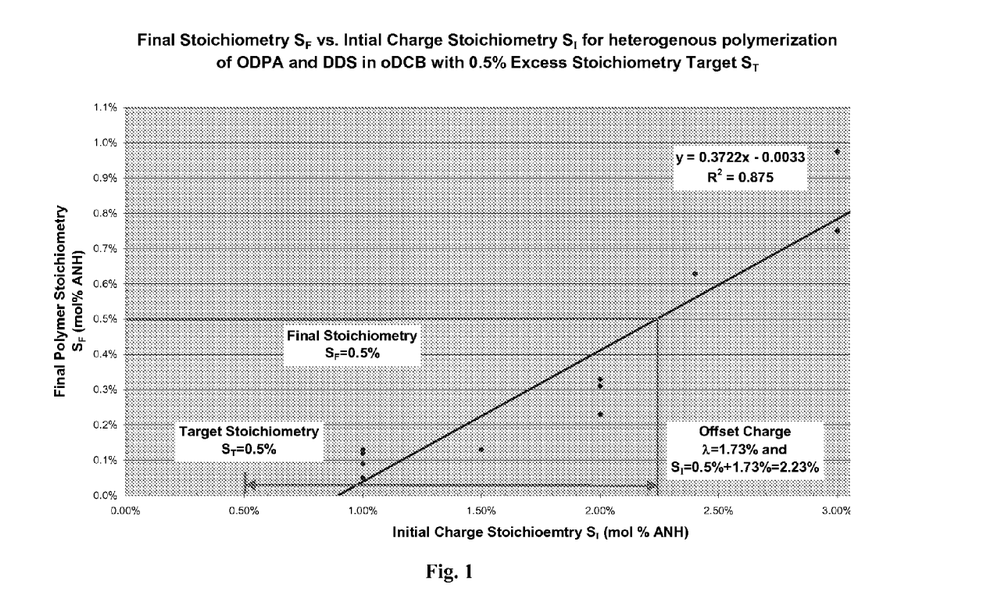
FIG. 1 is graph showing the relationship between the final stoichiometry and initial stoichiometry for heterogeneous polymerization of ODPA and DDS in ODCB for use in calculating the offset factor, λ.

In embodiments where anhydrides and amines are used, $\lambda$ can be determined as follows. An example of this type of calculation is shown in the FIG. 1 for the polymerization of 4,4' oxydiphthalic anhydride (ODPA) and 4,4' diamino diphenyl sulfone (DDS) in 1,2 dichlorobenzene (ODCB). A series of experiments, e.g., 11, can be performed at various initial stoichiometry charges, $S_{Ij}$, according to the above equation. A target stoichiometry ($S_T$) suitable for the user is selected, and the final stoichiometry ($S_F$) is measured. For instance, if $S_T$ is selected to be 0.5 mol % anhydride and $S_{Fi}$ for the polymer produced in each experiment is observed, the data ($S_{Fi}$ and $S_{Ij}$) are then plotted for $S_{Fi}$ vs. $S_{Ij}$, and a linear correlation determined as shown in the FIG. 1. In this case, the initial charge stoichiometry $S_I$ that gives $S_F$=0.5 mol % is $S_I$=2.23 mol % based on the linear correlation shown in the FIG. 1. Therefore by the equation $S_I = S_T + \lambda$, $\lambda$=1.73 mol % anhydride. Results may vary due to experimental error.

The amount of unreacted monomers in the sample can be analyzed by various titration and spectroscopic methods well known in the art. Spectroscopic methods include infrared, nuclear magnetic resonance, Raman spectroscopy, and fluorescence. Examples of infrared methods are described in J. A. Kreuz, et al, J. Poly. Sci. Part A-1, vol. 4, pp. 2607-2616 (1966). Examples of titration methods are described in Y. J. Kim, et al, Macromolecules, vol. 26, pp. 1344 1358 (1993). It may be advantageous to make derivatives of polymer end groups to enhance measurement sensitivity using variations of methods as described in K. P. Chan et al., Macromolecules, vol. 27, p. 6731 (1994) and J. S. Chao, Polymer Bull., vol. 17, p. 397 (1987).

Once the initial polymer formulation stoichiometry is decided, part-moles of the first reactive end group of the at least one first monomer to be initially charged to a reactor, $A_I$, and part-moles of the second reactive end group of the at least one second monomer to be initially charged to the reactor, $B_I$, is determined based on the following formula:

$$S_I = [A_I/B_I] - 1.$$

For example, the practitioner will select a predetermined amount of the second monomer to be initially charged to the reactor and calculate the gram-moles of the second reactive end group by the following formula:

$$B_I(\text{gram-moles}) = [(\text{grams } B_I/\text{molecular weight of } B_I \text{ in gram/mole})^*\text{no. of first reactive end groups in } B_I].$$

Knowing both $S_I$ and $B_I$ from the proceeding two equations, the gram-moles of the first reactive end group of the at least one first monomer $A_I$, may be calculated. The amount of the first monomer to be initially charged to the reactor is then determined by the following formula:

$$\text{grams } A_I = [(\text{gram-moles } A_I/\text{no. of second reactive end groups in } A_I)^*\text{molecular weight of } A_I \text{ in gram/mole})].$$

If more than one monomer containing the second reactive end group is used in the reaction, then $B_I$ would be the summation of the part-moles of the second reactive end groups in each monomer. The same such calculation would be used if more than one monomer containing the first reactive end group is used in the reaction. Such multiple reactants occurs when the reaction mixture additionally contains a chain stopper having the same reactive end group as the first or second monomer or more than one monomer containing the first or second reactive end group is used to create copolymers. Such calculations are more fully described in Example 1.

Following these determined variables, the at least one first monomer and the at least one second monomer are reacted in a reactor containing at least one organic solvent and forming a reaction mixture having solids in an amount that is more than 5 weight percent, based on the weight of the reaction mixture. The organic solvent of the reaction mixture preferably has a polarity index of greater than or equal to about 2.3 and a boiling point of greater than or equal to about 150° C. Preferably the reaction mixture contains solids in an amount of greater than 5 weight percent to less than 95 weight percent, more preferably in an amount of greater than 5 weight percent to less than 70 weight percent, and even more preferably in an amount of greater than 5 weight percent to less than 50 weight percent.

After a period of time sufficient to allow for reaction of the at least one first monomer and the at least one second monomer, the process continues by obtaining a representative sample from the reaction mixture. The sample is separated into a soluble phase and an insoluble phase comprising the thermoplastic polymer. Testing is conducted on the thermoplastic polymer obtained from the insoluble phase to determine a first reactive end group concentration of the at least one first monomer in the thermoplastic polymer as measured in part-moles ($A_R$) and a second reactive end group concentration of the at least one second monomer in the thermoplastic polymer as measured in part-moles ($B_R$). Testing is conducted on the soluble phase to determine a first reactive end group concentration of the at least one first monomer as measured in part-moles ($X_R$) and a second reactive end group concentration of the at least one second monomer as measured in part-moles ($Y_R$).

The concentration of first reactive end groups and second reactive end groups in the sample can be analyzed by various titration and spectroscopic methods well known in the art. Spectroscopic methods include infrared, nuclear magnetic resonance, Raman spectroscopy, and fluorescence. Examples of infrared methods are described in J. A. Kreuz, et al, J. Poly. Sci. Part A-1, vol. 4, pp. 2607-2616 (1966). Examples of titration methods are described in Y. J. Kim, et al, Macromolecules, vol. 26, pp. 1344 1358 (1993). It may be advantageous to make derivatives of polymer end groups to enhance measurement sensitivity using variations of methods as described in K. P. Chan et al., Macromolecules, vol. 27, p. 6731 (1994) and J. S. Chao, Polymer Bull., vol. 17, p. 397 (1987).

From this data, a reaction stoichiometry for the sample, $S_R$, is determined based on the following formula: $S_R=[A_R/B_R]-1$. Then, a value of $S_T-S_R$ is determined, which is the difference between the polymer target stoichiometry and the reaction stoichiometry at a period of time. If this value is less than or equal to zero, then an amount of part-moles of the second reactive end group of the at least one second monomer is added to the reaction for correction of stoichiometry. If this value is greater than zero, then an amount of part-moles of the first reactive end group of the at least one first monomer is added to the reaction for correction of stoichiometry.

The amount of part-moles (for correction of stoichiometry) of the second reactive end group of the at least one second monomer to be added if $S_T-S_R \leqq 0$ is determined by the following formula:

$$B_C = \alpha * B_I\left(\frac{1+S_R}{1+S_T} - 1\right) + \beta * X_R;$$

wherein $B_C$ is part-moles of the second reactive end group of the at least one second monomer for addition to the reaction, $B_I$ is the part-moles of the second reactive end group of the at least one second monomer initially charge to the reactor, $S_R$ is the reaction stoichiometry for the sample, $S_T$ is the polymer target stoichiometry, $X_R$ is part-moles of the first reactive end group of the at least one first monomer in the soluble phase of the sample, $\alpha$ is constant ranging from 1 to 20; $\beta$ is a constant ranging from 0 to 1.

The polymer target stoichiometry can vary depending on the monomers selected and how the offset factor is determined. When the offset factor is determined by forming a polyetherimide, such that the first reactive end group of the first monomer is an anhydride group and the second reactive end group of the second monomer is an amine group, the polymer target stoichiometry, $S_T$ can range from −3 mole % anhydride groups to +3 mole % anhydride groups. The negative mole % anhydride groups range indicates a deficiency of anhydride groups in the system (which corresponds to an excess amine groups in the system). In another embodiment, the polymer target stoichiometry, $S_T$ can range from −1 to +1. In one embodiment, the polymer target stoichiometry, $S_T$ can range from +0.3 mole % anhydride groups to 0.7 mol % anhydride groups. The skilled artisan will appreciate that variations can be made.

The constant $\alpha$ is a measurement of the effectiveness (for correction of stoichiometry) of how the second reactive end group, B, e.g., amine, is incorporated into the insoluble phase (i.e. polymer) and ranges from 1 to 20. For $\alpha=1$, all the second reactive end group, B, e.g., amine, charged to the reactor is consumed by the reaction into the insoluble phase indicating 100% effectiveness. For $\alpha=20$, very little of the second reactive end group, B, e.g., an amine, charged is incorporated indicating 5% effectiveness.

The constant $\alpha$ is dependent on an efficiency of incorporation of the part-moles of the second reactive group, e.g., amines, of the at least one second monomer used for addition to the reaction mixture, thereby impacting the stoichiometry. $\alpha$ can be determined by conducting a set of experiments that measure how efficiently the second monomer is incorporated into the solid phase (polymer) with and without correction. An initial charge stoichiometry, $S_I$, can be made, and the stoichiometry $S_R$ is measured at a point just prior to correction. An amount of second reactive end group, B, is then added as a correction. The nominal correction amount of second reactive end group, B, is initially calculated as $S_R-S_T$, since this is the case where $\alpha=1$ (100% incorporation of monomer B into solid polymer). This amount is defined as $S_{CB}$, or the mol % of type B correction. The final stoichiometry $S_F$ of the solid polymer is then also measured. The incorporation efficiency, $Eff_\alpha$, is then defined as the amount of change in the stoichiometry of the polymer relative to the amount of correction that was made, and can be represented by the following formula:

$$Eff_\alpha = \frac{S_F - S_R}{S_{CB}} = \frac{S_F - S_R}{S_R - S_T} = \frac{1}{\alpha}$$

A set of these experiments can performed at various values of $S_I$ with various corrections $S_{CB}$ and measured values of $S_R$ to develop a correlation of a to $S_R$. In future corrections, the value of $\alpha$ can then be used for a measured value of $S_R$ in order to calculate the appropriate correction of B.

The constant $\beta$ is defined as the fraction of first reactive end groups in the soluble phase that are consumed by the correction of the second reactive end groups over the course of the reaction. $\beta$ may be calculated by determining the part-moles of unreacted first reactive end group in the soluble phase at a first point in time of the reaction prior to any addition of the second reactive end group, which is $X_R$, and determining the part-moles of remaining unreacted first reactive end groups in the soluble phase at the end of the reaction, which is $X_F$. The part-moles of first reactive end groups consumed by the addition of the second reactive end groups at the end of the reaction is calculated in part moles as $X_R-X_F$, and thus, $$\beta = \frac{X_R - X_F}{X_R}.$$

The amount of part-moles of the first reactive end group of the at least one first monomer to be added (for correction of stoichiometry) if $S_T-S_R>0$ is determined by the following formula:

$$A_C = B_I * \delta(S_T-S_R) + \epsilon Y_R$$

wherein $A_C$ is the part-moles of the first reactive end group of the at least one first monomer for addition to the reaction, $B_I$ is the part-moles of the second reactive end group of the at least one second monomer initially charged to the reactor, $S_R$ is the reaction stoichiometry for the sample, $S_T$ is the polymer target stoichiometry, $Y_R$ is the part-moles of second reactive end group of the at least one second monomer in the soluble phase of the sample, δ is a constant ranging from 1 to 20, and ε is a constant ranging from 0 to 1.

The constant, ε, is defined as the fraction of second reactive end groups that are consumed by the correction of the first reactive end groups of the first monomer, A, over the course of the reaction. ε may be calculated by determining the part-moles of unreacted second reactive end group in the soluble phase of the reaction mixture at a first point in time of the reaction prior to any addition of the first reactive end group of the first monomer, A, which is $Y_R$, and determining the part-moles of remaining unreacted second reactive end groups in the soluble phase at the end of the reaction, which is $Y_F$. The part-moles of second reactive end groups consumed by the addition of the first reactive end groups at the end of the reaction is calculated in part moles as $Y_R-Y_F$, and thus.

$$\varepsilon = \frac{Y_R - Y_F}{Y_R}.$$

The constant δ is dependent on an efficiency of incorporation, $Eff_\delta$, of the part-moles of the first reactive group of the at least one first monomer used for addition to the reaction, thereby impacting the stoichiometry, i.e. $\delta=1/Eff_\delta$. Such is more fully described in Example 9.

After correction for stoichiometry variances, the thermoplastic polymer is formed. In a preferred embodiment, the amount of part-moles of the first reactive end group of the at least one first monomer or the amount of part-moles of the second reactive end group of the at least one second monomer, whichever applicable, is added within an appropriate time that allows for sufficient polymer formation for stoichiometry measurements, but also allows for correction to incorporate. In one preferred embodiment, the appropriate amount of time is within 4 hours after the sample is taken from the reaction mixture. This addition step is repeated as necessary to obtain the correct polymer stoichiometry. In one embodiment, the addition step is preferably repeated from 1 to 4 times during the reaction.

In another preferred embodiment of the invention, the process is for preparing a polyimide sulfone resin with interim correction for reaction stoichiometry to achieve a predetermined target stoichiometry wherein the reactants are aromatic dianhydride monomers and aromatic diamine monomers, respectively. The process comprises the steps of:

(a) selecting a polymer target stoichiometry, $S_T$, based on target incorporated part-moles of anhydride groups of an aromatic dianhydride monomer, $A_T$, and target incorporated part-moles amine groups of an aromatic diamine monomer, $B_T$, wherein at least one of the monomer groups comprises a sulfone linkage and wherein $S_T=[A_T/B_T]-1;$ (b) calculating an initial polymer formulation stoichiometry, $S_I$, by determining an offset factor, λ, and calculating the polymer formulation stoichiometry based on the formula:

$S_I=S_T+\lambda,$ wherein λ is a constant determined by experimentally determining an amount of a member selected from the group consisting of unreacted aromatic dianhydride monomers, unreacted aromatic diamine monomer, and combinations thereof, of a calibration sample thermoplastic polymer made by reacting aromatic dianhydride monomers and aromatic diamine monomers;

(c) determining part-moles of anhydride groups of the aromatic dianhydride to be added to a reactor, $A_I$, and part-moles of amine groups of the aromatic diamine to be added to the reactor, $B_I$, based on the following formula $S_I=[A_I/B_I]-1;$ (d) reacting the amount of the aromatic dianhydride and the amount of the aromatic diamine determined from step (c) in the reactor containing at least one organic solvent and forming a reaction mixture having solids in an amount that is more than are more than 5 weight percent, based on the weight of the reaction mixture;

(e) obtaining a sample from the reaction mixture after a period of time sufficient to allow for reaction of the aromatic dianhydride and the aromatic diamine to form the polyimide sulfone resin;

(f) separating the sample into a soluble phase and an insoluble phase comprising the polyimide sulfone resin;

(g) determining an anhydride group concentration in the polyimide sulfone resin of insoluble phase as measured in part-moles ($A_R$), an amine group concentration in the polyimide sulfone resin of the insoluble phase as measured in part-moles ($B_R$), an anhydride group concentration in the soluble phase as measured in part-moles ($X_R$), and an amine group concentration in the soluble phase as measured in part-moles ($Y_R$);

(h) determining a reaction stoichiometry for the sample, $S_R$, based on the following formula:

$S_R=[A_R/B_R]-1;$ (i) determining the value of $S_T-S_R$;

(j) selecting from
  (i) if $S_T-S_R\leq0$, adding to the reaction (for correction of stoichiometry) an amount of part-moles of amine groups, based on the formula:

$$B_C = \alpha * B_I\left(\frac{1+S_R}{1+S_T} - 1\right) + \beta * X_R,$$

wherein $B_C$ is part-moles of amine groups of the aromatic diamine for addition to the reaction, $B_I$ is the part-moles of amine groups of the aromatic diamine initially charged to the reactor, $S_R$ is the reaction stoichiometry for the sample, $S_T$ is the polymer target stoichiometry, $X_R$ is part-moles of anhydride groups of the aromatic dianhydride in the soluble phase of the sample, α is a constant ranging from 1 to 20; β is a constant ranging from 0 to 1; or
  (ii) if $S_T-S_R>0$, adding to the reaction (for correction of stoichiometry) an amount of part-moles of anhydride groups, based on the following formula:

$A_C=B_I*\delta(S_T-S_R)+\varepsilon Y_R$ wherein $A_C$ is part moles of anhydride groups of the aromatic dianhydride for addition to the reaction, $B_I$ is part-moles of amine groups of the aromatic diamine initially charged to the reactor, $S_R$ is the reaction stoichiometry for the sample, $S_T$ is the polymer target stoichiometry, $Y_R$ is part-moles of amine groups of the aromatic diamine in the soluble phase of the sample, δ is a constant measuring the effectiveness of anhydride group charge in the insoluble phase ranging from 1 to 20, and ε is an amine group effectiveness factor ranging from 0 to 1; and (k) forming the thermoplastic polyimide sulfone with a final stoichiometry, $S_F$.

Preferably, the polyimide sulfone is formed having a glass transition temperature of from about 200 to about 350° C., a residual volatile species concentration of less than about 500 ppm, and a reactive end group concentration of less than the target stoichiometry.

The polyimide sulfone may be further made with additional monomers comprising anhydride groups or amine groups. In such a case, the part-moles determinations need to account for the part-moles of anhydride groups or amine groups in the additional monomer. For example, polyimide sulfone resins may have varying levels of amine and anhydride end groups depending on the amounts of diamine and dianhydride used in the polymerization reaction and the degree of completeness of the polymerization reaction. A variety of amine and anhydride and/or anhydride derivatives such as carboxylic acid, carboxylate salts, amide-acids and amide-carboxylate salts are examples of possible end groups. In the present context it will be understood that the term "amine end groups" comprises end groups which are amines and any related end groups which are derived from amine end groups. In the present context it will also be understood that the term "anhydride end groups" comprises end groups which are anhydrides and anhydride derivatives such as carboxylic acid, carboxylate salts, amide-acids and amide-carboxylate salts (functional equivalents as di-acids, ester acids, salts of tertiary amines, etc. All types, more than one type or essentially one type of these end groups may be present.

Preferably, the reaction mixture further comprises a chain stopper selected from the group consisting of aromatic monocarboxylic acid anhydrides, monoamines, and combinations thereof. When a chain stopper is used, the part-moles of anhydride groups or amine groups are included in the stoichiometry calculations for the above process. More preferably, the polyimide sulfone is formed using the reaction components of 4,4' oxydiphthalic anhydride, 4,4'-diaminodiphenylsulfone, and aniline. In one embodiment, the polyimide sulfone is formed using the reaction components of 4,4' oxydiphthalic anhydride, 4,4'-diaminodiphenylsulfone, and phthalic anhydride. In one embodiment, a capping agent may be added to the reaction.

In certain embodiments, $\lambda$ ranges from 0.0001 to 1.

Preferably, the reaction is conducted at a pressure of 0.1 atm to 10 atm or at a pressure of 0.1 atm to 4.0 atm or at a pressure of 1.0 atm to 3.0 atm. The artisan will appreciate the variations may exist.

Advantageously, out invention now provides users a process that is particularly helpful in determining useful formulations that are suitable for making polymers with predetermined polymer target stoichiometries. Our invention provides a process that enables users to correct for stoichiometry variations occurring during polymerization reactions so that a predetermined polymer target stoichiometry may be achieved while preparing thermoplastic polymers. Beneficially, our process is flexible and can be used for heterogeneous polymerization conditions and homogenous polymerization conditions.

While the invention has been described with reference to preferred embodiment, it will be understood by those skilled in the art that various changes may be made, and equivalents substituted, for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out the present invention, but that the invention will include all embodiments falling within the scope of the appended claims.

EXAMPLES

The purpose of the following examples was to show that stoichiometry of a thermoplastic polymer, such as polyimide sulfone, was as able to be corrected over the course of the reaction. Examples 1, 3-8, 9 and 11 are employed to determine values of constants for use in correction equations and Examples 2, 10 and 12 demonstrate that the stoichiometry of a thermoplastic polymer, such as polyimide sulfone, is able to be corrected over the course of the reaction by using the correction equations.

Materials

The thermoplastic polymer prepared was a polyimide sulfone resin made from 4,4' oxydiphthalic anhydride (ODPA) or its tetra acid form (ODTA) which was ring-closed to ODPA prior to use, 4,4'-diaminodiphenylsulfone (DDS) and aniline as a chain stopper. The organic solvent employed in the reaction was 1,2 dicholoro-benzene (ODCB, PPG Grade F). All products are commercially available.

Setup

The reactor setup for all the examples involves manual charging of predetermined amounts of ODPA or ODTA, ODCB, DDS and aniline. In addition, a nitroge999n purge, ODCB make-up tank and heated sample port were included. For examples 1-8 and example 11, the reactor was equipped with two flights of 4 pitched blade impellers, partial and total reflux condensers and a backpressure regulator. For examples 9 and 10, which were performed on a scale larger than the other examples, the reactor was equipped with two flights of pitched blade impellers with 4 blades each and a radial impeller, partial and total reflux condensers and a back-pressure regulator. Polymer powder slurries were transferred from the reactor to a filter to remove mother liquor, and the wet cake polymer powder was then dried in a vacuum oven.

Experimental Protocol

The reactor was charged with the desired amount of dry purified ODPA or ODTA which was ring-closed to ODPA, and then the reactor was brought to room temperature. Next the desired amount of DDS and ODCB were also charged. The requisite amount of aniline was then added with ODCB to target a pre-determined number averaged molecular weight, $M_n$, for the final thermoplastic polymer. The reactor was sealed and purged with nitrogen gas to remove any oxygen remaining in the reactor, and a nitrogen purge stream was then established sufficient to regenerate the $N_2$ in the headspace 0.5-2 time/hr. The agitation was set such that the power input into the reactor was from 0.5 to 1.5 kW/m$^3$, and the heating oil temperature was set to 130° C. The reactor was heated to about 130° C. in 45 minutes. The reactor temperature was maintained at about 130° C. for 75 minutes, and then heated to about 165° C. in about 20 minutes. This temperature was maintained for 90 minutes. The backpressure regulator was then set to 26 psig, and the reactor was heated to 225-230° C. over 25 minutes. The reactor was held at this temperature for about 18-24 hours with periodic sampling of the reaction mixture for stoichiometry. If desired, a stoichiometry correction was made based on the initial stoichiometry during the course of the reaction at 225-230° C. The subsequent polymer powder was cooled, filtered and dried.

For initial charge of ODTA, a ring closure protocol was followed. The reactor was initially charged with the wet cake of the tetra acid form of ODPA, i.e. ODTA, that corresponds to the desired amount of ODPA. The reactor was then charged with the desired amount of ODCB, sealed and a purge with nitrogen was established sufficient to regenerate the $N_2$ in the headspace of the reactor between 0.5-2 time/hr. The agitation was set such that the power input into the reactor is 0.5 to 1.5 kW/m$^3$ prior to heating the reactor. The back-pressure regulator was set to 26 psig. The reactor was heated to 180° C. with hot oil over 50 minutes, generating 26 psig of pressure, which was mostly due to steam formation from free water in the ODTA and the water from de-hydration of the ODTA. Water and ODCB were distilled overhead starting from about 30 minutes into the heating cycle at a reactor temperature of 115° C. Water was collected over the next hour, with the reactor temperature maintained at 215-220° C. Once the reactor temperature rose to 230° C., it was maintained there for 30 minutes to ensure that all ODTA was converted to ODPA. The reactor was cooled overnight to room temperature.

Samples of the reaction mixture obtained from the reactor were separated into a soluble phase and an insoluble phase. A portion of the insoluble phase was subjected to heat treatment in the presence of solvent at a temperature above the Tg of the thermoplastic polymer to melt the sample and obtain a homogenous mixture. The heat treated polymer was then hot-pressed under pressure to obtain a final thin film. This film was then analyzed to quantify the amine and anhydride functionalities within the polymer using a Nicolet model 6700 FTIR instrument to determine the stoichiometry of the reacted polymer, $S_R$.

Example 1

The purpose of this Example was to determine β (for correction of stoichiometry) for use in the equation of the process for reaction stoichiometry resulting in $S_T - S_R \leq 0$, as follows:

$$B_C = \alpha * B_I \left( \frac{1+S_R}{1+S_T} - 1 \right) + \beta * X_R.$$

The charge of ODTA to the reactor on a dry basis was 3773 parts. After ring-closure of the ODTA to ODPA, 2491 parts of dry DDS was initially added as a powder followed by 110.1 parts of aniline. Therefore the total initial charge of amine groups in part-moles to the reactor, $B_I$ was calculated as $$B_I = \frac{2491}{248} \times 2 + \frac{110.1}{93} = 21.2725,$$

wherein the molecular weight of DDS is 248 and the molecular weight of aniline is 93. The intention of the example was to target a number averaged molecular weight, $M_n$ of 8400 and a target stoichiometry, $S_T$ of 0.005 with 5.56% chain stopper. The aniline mol % was defined with respect to the total moles of amine groups in the reaction, and can be determined based on the equation below:

$$\text{Aniline mole \%} = \frac{m_1}{m_1 + 2 \times m_2} \times 100$$

wherein $m_1$ is the number of moles of aniline and $m_2$ is the number of moles of the DDS. The ODPA charge constitutes a 2% over-charge to account for inherent losses of ODPA to the mother liquor. The amount of solvent ODCB employed at the start of the reaction corresponded to a 20% solids concentration. The reaction procedure implemented is described in the experimental protocol. After 6 hours at 225-230° C., the reactor was sampled. Stoichiometry corrections were made at the 6$^{th}$, 14$^{th}$, 18$^{th}$ and 22$^{nd}$ hour after the reactor reached a temperature of 225-230° C. The reaction was allowed to proceed for a total of 25 hours at 225-230° C. The subsequent polymer powder was cooled, filtered, dried.

Results and Discussion

We determined that $$\beta = \frac{X_R - X_F}{X_R} = \frac{0.1079}{0.1733} = 0.62.$$

Samples taken at the 6$^{th}$ hour after reaching a temperature of 225° C. displayed a reaction stoichiometry, $S_R$ of 0.012. A correction of 20 lbs of DDS was made at this point. Subsequent DDS corrections were made at the 14$^{th}$, 18$^{th}$ and 22$^{nd}$ hour of 10.2 parts, 13.0 parts and 12.0 parts, respectively. The final stoichiometry, $S_F$ at the end of the reaction was 0.007. In addition, residual levels in the filtrate, which corresponds to the soluble phase, of ODPA and ODIA, which is a mono-imide formed from the reaction of ODPA and aniline that still retains a reactive anhydride endgroup, were monitored over the course of the reaction. The concentrations of ODPA and ODIA in the 6$^{th}$ hour sample in the soluble phase were 0.076 wt % and 0.182 wt % respectively. Based on a total ODCB weight of 18000 parts, the part-moles of anhydride groups in the soluble phase during the reaction at the 6$^{th}$ hour prior to any addition of amine groups for stoichiometry correction, $X_R$ was calculated in part-moles as:

$$X_R = \frac{(0.076/100) \times 18000}{310} \times 2 + \frac{(0.182/100) \times 18000}{385} = 0.1733.$$

The concentrations of ODPA and ODIA at the end of the reaction were 0.01 wt % and 0.12 wt % respectively. Based on a total ODCB weight of 18000 parts, the part-moles of anhydride groups in the soluble phase at the end of the reaction, $X_F$ was calculated as $$X_F = \frac{(0.01/100) \times 18000}{310} \times 2 + \frac{(0.115/100) \times 18000}{385} = 0.0653$$

part-moles. Therefore, the part-moles of anhydride groups consumed by the DDS correction were calculated as $X_R - X_F = 0.1733 - 0.0653 = 0.1079$ part-moles. β is defined as the fraction of anhydride groups that are consumed by the correction of amine groups, i.e. DDS correction, over the course of the reaction. Therefore $$\beta = \frac{X_R - X_F}{X_R} = \frac{0.1079}{0.1733} = 0.62.$$

As indicated above, the amount of amine groups that needed to be added to correct a stoichiometric deviation from the desired target is determined by the following formula:

$$B_C = \alpha * B_I\left(\frac{1+S_R}{1+S_T} - 1\right) + \beta * X_R;$$

wherein $$\beta = \frac{X_R - X_F}{X_R} = \frac{0.1079}{0.1733} = 0.62$$

and α=1, because in the reactions in which $X_R$ was observed to be zero, the efficiency of the first term, α, could be evaluated independently and was found to be α=1. As such, the following equation was used to determine the amount of amine groups for correction at a point in time during the reaction.

$$B_C = B_I\left(\frac{1+S_R}{1+S_T} - 1\right) + 0.62 * X_R.$$

Conclusion

This example shows that the fraction of anhydride groups present in the soluble phase reacting with the DDS correction must be accounted for in order to allow for the final polymer to achieve the desired stoichiometry target.

Example 2

The purpose of Example 2 was to show that given a predetermined initial amine group charge in part-moles $B_I$, predetermined target stoichiometry $S_T$, an observed/measure stoichiometry $S_R$, and part-moles of anhydride groups in the soluble phase, $X_R$, it was possible to achieve a predetermined target stoichiometry by adding the amount of part-moles of amine groups from DDS as determined from the equation:

$$B_C = B_I\left(\frac{1+S_R}{1+S_T} - 1\right) + 0.62 * X_R$$

wherein β=0.62, as determined in Example 1

The charge of ODTA to the reactor was as wet-cake at 88.8% solids by weight and containing free residual water. The mass charge of ODTA on a dry basis was 3958 parts. After ring-closure of the ODTA to ODPA, 2699 parts of dry DDS was initially added as a powder followed by 51 parts of aniline. The intention of the example was to target a number averaged molecular weight, $M_n$, of 17500 and target stoichiometry, $S_T$ of 0.005, which corresponds to 0.5 mol % anhydride and is denoted 0.005 with 2.46 mol % chain stopper concentration, as defined in Example 1. The ODPA charge constitutes a 2 mol % over-charge to account for inherent losses of anhydride reactive end-groups in the form of ODPA to the mother liquor. The amount of solvent ODCB employed at the start of the reaction corresponded to a 20% solids concentration. The reaction procedure implemented is described in the experimental protocol. After 6 hours at 225-230° C., the reactor was sampled. Stoichiometry corrections were made at the $6^{th}$ and $10^{th}$ hour after the reactor reached a temperature of 225-230° C. The reaction was allowed to proceed for a total of 15 hours at 225-230° C. The subsequent polymer powder was cooled, filtered, dried.

Results and Discussion

Samples taken at the $6^{th}$ hour after reaching a temperature of 225-230° C. indicated an insoluble phase reaction stoichiometry, $S_R$ of 0.011. The concentrations of ODPA and ODIA in the soluble phase of the $6^{th}$ hour sample were 0.03 wt % and 0.04 wt % respectively. To achieve a target stoichiometry, $S_T$, of 0.005, the correction required is $S_T-S_R$=0.005-0.011=−0.006. Therefore, the effective correction moles of amine groups required for the correction can be calculated by the equation described above as follows:

$$B_C = \alpha * B_I\left(\frac{1+S_R}{1+S_T} - 1\right) + \beta * X_R$$

$$= 22.3145\left(\frac{1+0.011}{1+0.005} - 1\right) + 0.62 \times 0.0658$$

$$= 0.1740;$$

wherein $B_c$ is the part-moles of amine groups in the correction, $B_I$ was the part-moles of amine initially charged to the reaction part moles, $X_R$ is the part-moles of anhydride groups present in the soluble phase before the correction and β is the fraction of part-moles of these anhydride groups that react with the amine correction. Since the correction is made with the diamine, DDS, the number of moles of DDS=$B_C$/2=0.0870, which corresponds to 21.58 parts of DDS. Based on this value, the DDS was added in two stages, 13.3 parts at the $6^{th}$ hour and 7 parts at the $10^{th}$ hour amounting to a total of 20.3 parts~21.58 parts. The final stoichiometry, $S_F$ of the thermoplastic polymer at the end of the reaction was 0.0065. In addition, the residual ODPA and ODIA levels in the soluble phase at the end of the reaction were 0.01 wt % and 0.04 wt % respectively.

Conclusions

The target stoichiometry, $S_T$ in this example was 0.005±0.002 and the final stoichiometry of the isolated polymer powder was 0.0065. This shows that when the stoichiometric correction of DDS accounts for the amount of DDS reacting with anhydride groups in the soluble phase, the stoichiometry correction allows for the final polymer to achieve the desired stoichiometry target.

Examples 3-9

The purpose of Examples 3-9 was to determine the parameters used to calculate δ that is used in the following formula: $A_C=B_I*δ(S_T−S_R)+εY_R$. To accurately determine δ, several examples were conducted to ensure that possible variations that may occur were considered.

Example 3

The reactor was charged with 1586.6 parts of wet ODTA at about 84.41 wt % solids. This corresponds to about 1339 parts of ODTA on a dry basis. Once the ring closure was completed, the ODPA in the reactor was calculated to be 1197.6 parts. Next, 932.15 parts of DDS and 16.0936 parts of aniline corresponding to 2.25 mol % chain stopper as defined in Example 1 were charged to the reactor. Total ODCB charged to the reactor was 8163 parts. In this experiment, the efficiency of an ODPA correction to a formulation that is purposely initially short on anhydride groups was being evaluated. Therefore, the charge of 1197.6 parts of ODPA was purposefully short by 6.4 parts for a target stoichiometry, $S_T$ of 0.01, which calls for 1204 parts of ODPA. Based on the desired value of 1204 parts of ODPA, the intention of the experiment was to target an $S_T=0.01$, with 2.25 mol % chain stopper and a theoretical target number averaged molecular weight, $M_n$ of 15,976. The reaction procedure as described in the experimental protocol was implemented. After 1 hour at 225-230° C., the reactor was sampled. A stoichiometry correction was made at the $3^{rd}$ hour with ODPA. The reaction was allowed to proceed for a total of 18.5 hours at 225-230° C. The subsequent polymer powder was cooled, filtered, dried.

Results and Discussion

After 1 hour at 225-230° C., a sample indicated that the insoluble phase stoichiometry, $S_R$ was 0.0025. Based on the 1-hour sample result of $S_R=0.0025$, the correction moles of anhydride groups required, $A_C=B_I\delta(S_T-S_R)=7.690\times1\times(0.01-0.0025)=0.058$ part-moles where $A_C$ is the part-moles of anhydride groups required for the correction, and $B_I$ was the part-moles of amine initially charged to the reaction. $\delta$ is the coefficient that is dependent on the incorporation efficiency, which is a constant accounting for the effectiveness of incorporation of anhydride group charge in the insoluble phase and is assumed to be 1 in this example since a 100% efficiency of incorporation of anhydride groups into the polymer was assumed. Since the correction was made with the dianhydride, ODPA, therefore, the number of moles of ODPA=$A_C/2=0.029$ part-moles which corresponds to 8.99 parts of ODPA. Further, 9.03 parts of ODPA was added to the reactor at the 3-hour mark. The final stoichiometry, $S_F$ of the isolated insoluble phase (i.e. polymer) was 0.0072, which was 0.0028 short of the target stoichiometry, $S_T=0.01\pm0.002$.

An HPLC analysis of the filtered mother liquor, i.e. the soluble phase, indicated that there was still 0.05 wt % ODPA present. In addition, there was 0.027 wt % of the imide formed from the reaction of ODPA and aniline, denoted ODIA.

Conclusion

This example shows that there were ODPA losses to the mother liquor that must be accounted for when making a correction in order to allow for the final polymer to achieve the desired stoichiometry target.

Example 4

The reactor was charged with 1286.7 parts of dry purified ODPA. Next, 991 parts of DDS and 21.021 parts of aniline corresponding to 2.75 mol % chain stopper were charged to the reactor. Total ODCB charged to the reactor was 8316 parts. The reaction procedure as described in the experimental protocol was implemented. After 2 hours at 225-230° C., the reactor was sampled. A stoichiometry correction was made at the $4^{th}$ hour with ODPA. The reaction was allowed to proceed for a total of 22 hours at 225-230° C. The subsequent polymer powder was cooled, filtered, dried.

Results and Discussion

After 2 hours at 225-230° C., a sample indicated that the insoluble phase stoichiometry, $S_R$ was -0.0021. A correction of 5.78 parts of ODPA was added to the reactor at the 4-hour mark. This corresponds to 0.0186 moles of ODPA or 0.0372 part-moles of anhydride groups. Based on 100% incorporation of the correction into the insoluble phase, the final stoichiometry, $S_{100\%}$ of the insoluble phase was calculated to be $$S_{T100\%} = \frac{A_C}{B_I\delta} + S_R = \frac{0.0372}{8.217\times1} + (-0.0021) = 0.0024,$$

where $A_C$ is the part-moles of anhydride groups in the correction, $B_I$ was the part-moles of amine groups initially charged to the reaction and $\delta$ is the coefficient that is dependent on the incorporation efficiency which is assumed to be 1 for the purpose of the calculating $S_F$ and determining the efficiency of Example 9. The final stoichiometry, $S_F$, of the isolated insoluble phase was 0.0005, which was 0.0019 short of the stoichiometry for 100% incorporation, $S_{100\%}=0.0024$.

An HPLC analysis of the filtered mother liquor soluble portion indicated that there was still 0.0121 wt % ODPA present. In addition, there was 0.0533 wt % of the imide formed from the reaction of ODPA and aniline, denoted ODIA.

Conclusion

This example shows that there were ODPA losses to the mother liquor that must be accounted for when making a correction, in order to allow for the final polymer to achieve the desired stoichiometry target.

Example 5

The reactor was charged with 1261.2 parts of dry purified ODPA. Next, 991 parts of DDS, 21.021 parts of aniline corresponding to 2.75 mol % chain stopper were charged to the reactor. Total ODCB charged to the reactor was 8139 parts. The reaction procedure as described in the experimental protocol was implemented. After 2 hours at 225-230° C., the reactor was sampled. A stoichiometry correction was made at the $4^{th}$ hour with ODPA. The reaction was allowed to proceed for a total of 24 hours at 225-230° C. The subsequent polymer powder was cooled, filtered, dried.

Results and Discussion

After 2 hours at 225-230° C., a sample indicated that the insoluble phase stoichiometry, S was -0.009. A correction of 26.0 parts of ODPA was added to the reactor at the 4-hour mark. This corresponds to 0.0838 part-moles of ODPA or 0.1677 part-moles of anhydride groups. Based on 100% incorporation of the correction into the insoluble phase, the final stoichiometry, $S_{100\%}$ of the insoluble phase was calculated to be $$S_{T100\%} = \frac{A_C}{B_I\delta} + S_R = \frac{0.1677}{8.217\times1} + (-0.009) = 0.011,$$

where $A_C$ is the part-moles of anhydride groups in the correction, $B_I$ was the part-moles of amine initially charged to the reaction and $\delta$ is the coefficient that is dependent on the incorporation efficiency which is assumed to be 1 since a 100% efficiency of incorporation was assumed. The final stoichiometry, $S_F$ of the isolated insoluble phase was -0.0011, which was 0.0125 short of the stoichiometry for 100% incorporation, $S_{100\%}=0.011$.

An HPLC analysis of the filtered mother liquor indicated that there was still 0.0087 wt % ODPA present. In addition, there was 0.0410 wt % of the imide formed from the reaction of ODPA and aniline, denoted ODIA.

Conclusion

This Example shows that there were ODPA losses to the mother liquor that must be accounted for when making a correction, in order to allow for the final polymer to achieve the desired stoichiometry target.

Example 6

The reactor was charged with 1261.2 parts of dry purified ODPA. Next, 974.2 parts of DDS, 33.65 parts of aniline corresponding to 4.40 mol % chain stopper were charged to the reactor. Total ODCB charged to the reactor was 8663 parts. The reaction procedure as described in the experimental protocol was implemented. After 2 hours at 225-230° C., the reactor was sampled. A stoichiometry correction was made at the 4$^{th}$ hour with ODPA. The reaction was allowed to proceed for a total of 10 hours at 225-230° C. The subsequent polymer powder was cooled, filtered, dried.

Results and Discussion

After 2 hours at 225-230° C., a sample indicated that the insoluble phase stoichiometry, $S_R$ was −0.006. A correction of 38.5 parts of ODPA was added to the reactor at the 4-hour mark. This corresponds to 0.1242 part-moles of ODPA or 0.2484 part-moles of anhydride groups. Based on 100% incorporation of the correction into the insoluble phase, the final stoichiometry, $S_{100\%}$ of the insoluble phase was calculated to be $$S_{T100\%} = \frac{A_C}{B_I \delta} + S_R = \frac{0.2484}{8.218 \times 1} + (-0.006) = 0.0239,$$

where $A_C$ is the part-moles of anhydride groups in the correction, $B_I$ was the part-moles of amine initially charged to the reaction and $\delta$ is the coefficient that is dependent on the incorporation efficiency which is assumed to be 1 since a 100% efficiency of incorporation was assumed. The final stoichiometry, $S_F$ of the isolated insoluble phase was 0.0068, which was 0.0174 short of the stoichiometry for 100% incorporation, $S_{100\%}$=0.0239.

An HPLC analysis of the filtered mother liquor indicated that there was still 0.1077 wt % ODPA present. In addition, there was 0.0509 wt % of the imide formed from the reaction of ODPA and aniline, denoted ODIA.

Conclusion

This example shows that there were ODPA losses to the mother liquor that must be accounted for when making a correction, in order to allow for the final polymer to achieve the desired stoichiometry target.

Example 7

The reactor was charged with 2165 parts of wet ODTA at about 94.53 wt % solids. This corresponds to about 2046 parts of ODTA on a dry basis, and once the ring closure was completed as described in the experimental protocol, the ODPA in the reactor was calculated to be 1826 parts. Next, 1351.7 parts of DDS, 60.76 parts of aniline corresponding to 5.65 mol % chain stopper were charged to the reactor. Total ODCB charged to the reactor was 8912 parts. The reaction procedure as described in the experimental protocol was implemented. After 2.5 hours at 225-230° C., the reactor was sampled. A stoichiometry correction was made after 4.7 hours at 225-230° C. with ODPA. The reaction was allowed to proceed for a total of 10 hours at 225-230° C. The subsequent polymer powder was cooled, filtered, dried.

Results and Discussion

After 2.5 hours at 225-230° C., a sample indicated that the insoluble phase stoichiometry, $S_R$ was 0.0006. A correction of 22 parts of ODPA was added to the reactor at the 4-hour mark. This corresponds to 0.071 part-moles of ODPA or 0.142 part-moles of anhydride groups. Based on 100% incorporation of the correction into the insoluble phase, the final stoichiometry, $S_{100\%}$ of the insoluble phase was calculated to be $$S_{T100\%} = \frac{A_C}{B_I \delta} + S_R = \frac{0.142}{11.554 \times 1} + 0.0006 = 0.0126,$$

where $A_C$ is the part-moles of anhydride groups in the correction, $B_I$ was the part-moles of amine initially charged to the reaction and $\delta$ is the coefficient that is dependent on the incorporation efficiency which is assumed to be 1 since a 100% efficiency of incorporation was assumed. The final stoichiometry, $S_F$ of the isolated insoluble phase was 0.008, which was 0.0046 short of the stoichiometry for 100% incorporation, $S_{100\%}$=0.0126.

An HPLC analysis of the filtered mother liquor indicated that there was still 0.0861 wt % ODPA present. In addition, there was 0.1219 wt % of the imide formed from the reaction of ODPA and aniline, denoted ODIA.

Conclusion

This example shows that there were ODPA losses to the mother liquor that must be accounted for when making a correction, in order to allow for the final polymer to achieve the desired stoichiometry target.

Example 8

The reactor was charged with 1586.6 parts of wet ODTA at about 84.41 wt % solids. This corresponds to about 1339 parts of ODTA on a dry basis, and once the ring closure was completed as described in the experimental protocol, the ODPA in the reactor was calculated to be 1200 parts. Next, 933.7 parts of DDS, 16.123 parts of aniline corresponding to 2.25 mol % chain stopper were charged to the reactor. Total ODCB charged to the reactor was 8181 parts. The reaction procedure as described in the experimental protocol was implemented. After 1 hours at 225-230° C., the reactor was sampled. A stoichiometry correction was made at the 3$^{rd}$ hour with ODPA. The reaction was allowed to proceed for a total of 7 hours at 225-230° C. The subsequent polymer powder was cooled, filtered, dried.

Results and Discussion

After 2.5 hours at 225-230° C., a sample indicated that the insoluble phase stoichiometry, $S_R$ was 0.0034. A correction of 8 parts of ODPA was added to the reactor at the 3-hour mark. This corresponds to 0.0258 part-moles of ODPA or 0.0516 part-moles of anhydride groups. Based on 100% incorporation of the correction into the insoluble phase, the final stoichiometry, $S_{100\%}$ of the insoluble phase was calculated to be $$S_{T100\%} = \frac{A_C}{B_I \delta} + S_R = \frac{0.0516}{7.7032 \times 1} + 0.0034 = 0.0100,$$

where $A_C$ is the part-moles of anhydride groups in the correction, $B_I$ was the part-moles of amine initially charged to the reaction and $\delta$ is the coefficient that is dependent on the incorporation efficiency which is assumed to be 1 since a 100% efficiency of incorporation was assumed. The final stoichiometry, $S_F$ of the isolated insoluble phase was 0.0082, which was 0.0018 short of the stoichiometry for 100% incorporation, $S_{100\%}$=0.0100.

An HPLC analysis of the filtered mother liquor indicated that there was still 0.0835 wt % ODPA present. In addition, there was 0.0552 wt % of the imide formed from the reaction of ODPA and aniline, denoted ODIA.

Conclusion

The results of this example showed that there were ODPA losses to the mother liquor that must be accounted for when making a correction, in order to allow for the final polymer to achieve the desired stoichiometry target.

Example 9

This example provided a determination of $\delta$ for use in $A_C = B_I * \delta(S_T - S_R) + \epsilon Y_R$ based on information obtained in Example 3-8 for ODPA corrections. Data from Examples 3-8 in Table 1 were used to generate the transfer function. Column 2 displays the stoichiometry prior to charging the anhydride correction. Column 3 lists the final stoichiometry of the powder at the end of the reaction after the correction and column 4 presents the calculated stoichiometry of the powder if 100% of the correction had been incorporated. Column 5 lists the efficiency for each of the examples which was calculated as $$Eff_\delta = \frac{(S_F - S_R)}{(S_{F100\%} - S_R)} = \frac{1}{\delta}.$$

TABLE 1

| Experiment | Stoichiometry Prior to Correction ($S_R$) | Final Stoichiometry of Reaction ($S_F$) | Calculated Stoichiometry for 100% Incorporation ($S_{100\%}$) | Efficiency of Incorporation, $Eff_\delta$ |
|---|---|---|---|---|
| Example 3 | 0.0025 | 0.0072 | 0.0100 | 0.63 |
| Example 4 | −0.0020 | 0.0005 | 0.0024 | 0.58 |
| Example 5 | −0.0090 | −0.0011 | 0.0110 | 0.40 |
| Example 6 | −0.0061 | 0.0068 | 0.0239 | 0.23 |
| Example 7 | 0.0006 | 0.0080 | 0.0126 | 0.67 |
| Example 8 | 0.0034 | 0.0082 | 0.0100 | 0.72 |

Figure 2:
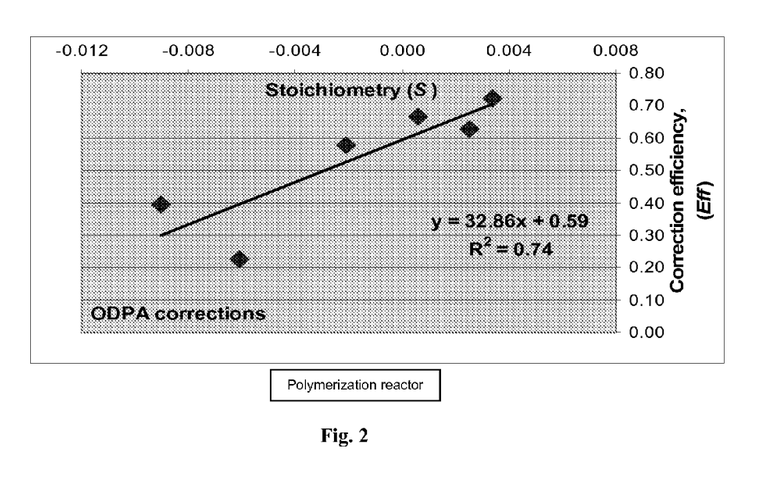
FIG. 2 is graph showing the relationship between the efficiency of incorporation and stoichiometry prior to correction by addition of anhydride groups for Examples 3-8.

A linear relationship as shown in FIG. 2 exists between $Eff_\delta$ and $S_R$ and was identified by the equation $Eff_\delta = 32.86 \times S_R + 0.59$. $R^2$ was determined to be 0.74.

When the stoichiometry, $S_R$, was measured to be less than the target stoichiometry, i.e. $St - S_R > 0$, the addition of a calculated amount of ODPA based on the deviation from the target multiplied by an efficiency of incorporation dependent coefficient, $\delta$, is necessary to modify the stoichiometry to within the target range. The efficiency of incorporation, $Eff_\delta$, is an important factor because some amount of the anhydride was lost to the solvent. By definition, $$\delta = \frac{1}{Eff_\delta}.$$

Therefore, $$\delta = \frac{1}{32.86 \times S_R + 0.59}.$$

And thus, the transfer function for anhydride corrections was defined as $$A_C = B_I \left( \frac{1}{32.86 \times S_R + 0.59} \right)(S_T - S_R),$$

wherein $A_C$ is the part-moles of anhydride groups required for the correction. In the case of ODPA, a dianhydride, the part-moles of ODPA is $A_C/2$.

Example 10

The purpose of Example 10 was to determine the efficiency factor.

More particularly, Example 10 shows that given a predetermined initial amine group charge, $B_I$, predetermined target Stoichiometry $S_T$, an observed/measure Stoichiometry $S_R$, it was possible to achieve a predetermined target Stoichiometry by adding the amount of anhydride groups as determined from the equation $A_C = B_I * \delta(S_T - S_R) + \epsilon Y_R$, where $$\delta = \frac{1}{32.86 \times S_R + 0.59},$$

as determined in Example 9 and $Y_R$ is measured to be 0.

The reactor was charged with 1261.2 parts of dry, purified ODPA. Next 991.0 part of DDS and 8,024 parts of ODCB were also charged. The chain-stopper was then added as 21.021 parts of aniline along with another 96 parts of ODCB. Total ODCB added was 8120 parts. The intention was to target a number averaged molecular weight, $M_n$ of 15885, based on a target stoichiometry, $S_T$ of 0.005 with 2.75 mol % chain-stopper. However, in order to achieve this, the actual ODPA charge required would be 1280.3 parts. Therefore, the 1261.2 parts added was intentionally undercharging anhydride by 1.5%, so that the initial formulation is actually 1% amine excess. The intent was to satisfactorily reach the target stoichiometry to within ±0.002 (the accuracy of the stoichiometry measurement) by making an anhydride correction by employing the correction rule equation derived above. After 4 hours at 225-230° C., the reactor was sampled. No stoichiometry corrections were made. The reaction was allowed to proceed for a total of 24 hours at 225-230° C. The subsequent polymer powder was cooled, filtered, dried.

Results and Discussion

After 4 hours at 225-230° C., a sample indicated that the polymer powder stoichiometry, $S_R$, was −0.0069. To achieve a target stoichiometry, $S_T$, of 0.005, the correction required is $S_T - S_R = 0.005 - (-0.0069) = 0.0119$. Therefore, the effective correction moles of anhydride groups required for the correction can be calculated by the equation described above as follows:

$$A_C = B_I * \delta = 8.218 \times \frac{1}{32.86 \times (-0.0069) + 0.59} \times 0.0119 = 0.269$$

part-moles. Since the correction is made with the dianhydride, ODPA, therefore, the number of moles of ODPA=$A_C/2$=0.134 part-moles which corresponds to 41.54 parts of ODPA. Based on this value, 38 grams of ODPA was added as an anhydride correction. The reaction was allowed to proceed for 20 hours after the correction. The final stoichiometry, $S_F$ of the isolated polymer powder was 0.0032.

Conclusion

The target stoichiometry, $S_T$ in this example was 0.005±0.002 and the final stoichiometry, $S_F$ of the isolated polymer powder was 0.0032. This shows that when ODPA losses to the mother liquor are accounted for in the form of an efficiency of incorporation, the stoichiometry correction allows for the final polymer to achieve the desired stoichiometry target.

Example 11

Comparative

The purpose of this Example was to show that in the absence of a stoichiometric correction as described above, ODPA/DDS polymerization results in a polymer with unsuitable properties, because a stoichiometric error persists in the insoluble phase and stays constant during the ODPA/DDS polymerization.

The reactor was charged with 1287.6 parts of dry, purified ODPA. Next 991 parts of DDS, 21.023 parts of aniline and 8491 parts of ODCB were also charged. The agitator was started at 100 RPM (agitator RPM is dependant on the reactor size and agitator design) to break up any chunks of monomer, and to homogenize the slurry. This recipe was targeted to produce a polymer with a theoretical number averaged molecular weight, $M_n$ of 13811, at a stoichiometry, $S_T$, of 0.01 with 2.75 mol % aniline as chain-stopper. After 2 hours at 225-230° C., the reactor was sampled. No stoichiometry corrections were made. The reaction was allowed to proceed for a total of 22 hours at 225-230° C. The subsequent polymer powder was cooled, filtered, dried.

Results and Discussion

After 2 hours at 225-230° C., analysis of the insoluble phase of the reactor sample indicated that the polymer powder stoichiometry, $S_R$ was 0.002. The final stoichiometry, $S_F$ of the isolated polymer powder was 0.0009.

Conclusions

The example demonstrates that in the absence of an overcharge factor, i.e. $S_T'-S_T=\lambda=0$, when formulating the charge of anhydride and amine groups prior to start of reaction or any correction charge of anhydride or amine groups during the reaction, a stoichiometry offset from the target that stays constant over the course of the reaction and isolation exists and produces a polymer with undesired properties.

Example 12

Comparative

The purpose of this Example was to show that in the absence of a stoichiometric correction, employing an overcharge factor, λ such that the formulated stoichiometry, $S_T'=S_T+\lambda$ results in a polymer at the target stoichiometry, $S_T$ that stays constant during the ODPA/DDS polymerization.

The reactor was charged with 1827 parts of dry, purified ODPA. Next 1351.7 parts of DDS and 12028 parts of ODCB were also charged. The agitator was started at 100 RPM (agitator RPM is dependant on the reactor size and agitator design) to break up any chunks of monomer, and to homogenize the slurry. The chain-stopper was then added as 60.76 parts of aniline along with another 143 parts of ODCB. Total ODCB added was 12171 parts. This recipe had an initial formulation stoichiometry, $S_I$=0.02 and was targeted to produce a polymer with a theoretical number averaged molecular weight, $M_n$ of 8256, at a target stoichiometry, $S_T$, of 0.005 with 5.65 mol % aniline as chain-stopper. The stoichiometric overcharge factor in this example was $S_T'-S_T=2=0.015$. After 4 hours at 225-230° C., the reactor was sampled. No stoichiometry corrections were made. The reaction was allowed to proceed for a total of 24 hours at 225-230° C. The subsequent polymer powder was cooled, filtered, dried.

Results and Discussion

After 4 hours at 225-230° C., analysis of the insoluble phase of the reactor sample indicated that the polymer powder stoichiometry, $S_R$ was 0.0026. The final stoichiometry, $S_F$ of the isolated polymer powder was 0.0031 which is at the desired target of 0.005±0.002.

Conclusions

The example demonstrates that in the presence of an overcharge factor, i.e. $S_T'S_T=\lambda=0.015$, when formulating the charge of anhydride and amine groups prior to start of reaction and no correction charge of anhydride or amine groups during the reaction, the target polymer stoichiometry was obtained.

We claim:

1. A process for preparing a thermoplastic polymer to achieve a predetermined polymer target stoichiometry, wherein a thermoplastic polymer is made from at least one first monomer having a first reactive end group and at least one second monomer having a second reactive end group, by reaction of the first reactive end group with the second reactive end group and has a glass transition temperature of greater than 130° C., and comprising the steps of:

(a) selecting a polymer target stoichiometry, $S_T$, based on a target incorporated part-moles of a first reactive end group of at least one first monomer, $A_T$, and a target incorporated part-moles of a second reactive end group of at least one second monomer, $B_T$, wherein $S_T=[A_T/B_T]-1$;

(b) calculating an initial polymer formulation stoichiometry, $S_I$, by determining an offset factor, λ, and calculating the polymer formulation stoichiometry based on the following formula:

$S_I=S_T+\lambda$, wherein the offset factor is determined by experimentally determining an amount of a member selected from the group consisting of unreacted first monomers, unreacted second monomers, and combinations thereof, of a calibration sample thermoplastic polymer made by reacting the at least one first monomer and the at least one second monomer;

(c) determining part-moles of the first reactive end group of the at least one first monomer to be initially charged to a reactor, $A_I$, and part-moles of the second reactive end group of the at least one second monomer to be initially charged to the reactor, $B_I$, based on the following formula:

$S_I=[A_I/B_I]-1$;

(d) reacting an amount of the at least one first monomer and an amount of the at least one second monomer as determined from step (c) in the reactor containing at least one organic solvent and forming a reaction mixture having solids in an amount that is more than 5 weight percent, based on the weight of the reaction mixture;

(e) obtaining a sample from the reaction mixture after a period of time sufficient to allow for reaction of the at least one first monomer and the at least one second monomer to form the thermoplastic polymer;

(f) separating the sample into a soluble phase and an insoluble phase comprising the thermoplastic polymer;

(g) determining a first reactive end group concentration of the at least one first monomer in the thermoplastic polymer as measured in part-moles ($A_R$), a second reactive end group concentration of the at least one second monomer in the thermoplastic polymer as measured in part-moles ($B_R$), a first reactive end group concentration of the at least one first monomer in the soluble phase as measured in part-moles ($X_R$), and a second reactive end group concentration of the at least one second monomer in the soluble phase as measured in part-moles ($Y_R$);

(h) determining a reaction stoichiometry for the sample, $S_R$, based on the following formula:

$$S_R = [A_R/B_R] - 1;$$

(i) determining a value of $S_T - S_R$;

(j) selecting from, (i) if $S_T - S_R \leq 0$, adding to the reaction an amount of part-moles of the second reactive end group of the at least one second monomer, based on the following formula:

$$B_C = \alpha * B_I \left( \frac{1 + S_R}{1 + S_T} - 1 \right) + \beta * X_R,$$

wherein $B_C$ is part-moles of the second reactive end group of the at least one second monomer for addition to the reaction, $B_I$ is the part-moles of the second reactive end group of the at least one second monomer initially charge to the reactor, $S_R$ is the reaction stoichiometry for the sample, $S_T$ is the polymer target stoichiometry, $X_R$ is part-moles of the first reactive end group of the at least one first monomer in the soluble phase of the sample, α is a constant ranging from 1 to 20; β is a constant ranging from 0 to 1;

or (ii) if $S_T - S_R > 0$, adding to the reaction an amount of part-moles of the first reactive end group of the at least one first monomer, based on the following formula:

$$A_C = B_I * \delta(S_T - S_R) + \epsilon Y_R$$

wherein $A_C$ is the part-moles of the first reactive end group of the at least one first monomer for addition to the reaction, $B_I$ is the part-moles of the second reactive end group of the at least one second monomer initially charged to the reactor, $S_R$ is the reaction stoichiometry for the sample, $S_T$ is the polymer target stoichiometry, $Y_R$ is the part-moles of second reactive end group of the at least one second monomer in the soluble phase of the sample, δ is a constant ranging from 1 to 20, and ε is a constant ranging from 0 to 1; and;

(k) forming the thermoplastic polymer with a final stoichiometry, $S_F$.

2. The process of claim 1, wherein the thermoplastic polymer is selected from the group consisting of polyimides, polysulfones, polyimide sulfones, polyetherimides, polyetherimide sulfones, polyesters, polybenzoxazoles, and combinations thereof.

3. The process of claim 2, wherein the thermoplastic polymer is a polyetherimide and the first reactive end group of the at least one first monomer is an anhydride group of an aromatic dianhydride monomer and the second reactive end group of the at least second monomer is an amine group of an aromatic diamine monomer.

4. The process of claim 2, wherein the thermoplastic polymer is a polyimide sulfone having a glass transition temperature of from about 200 to about 350° C., a residual volatile species concentration of less than about 500 ppm and a reactive end group concentration of less than or equal to the polymer target stoichiometry.

5. The process of claim 2, wherein the thermoplastic polymer is a polysulfone and the at least one first monomer is a dihalodiphenylsulfone and the at least one second monomer is a bisphenol.

6. The process of claim 2, wherein the thermoplastic polymer is a polyester and the at least one first monomer is a diacid or a functionally equivalent diester and the at least one second monomer is a diol.

7. The process of claim 1, wherein the thermoplastic polymer is further made with an additional monomer.

8. The process of claim 7, wherein the additional monomer is a chain stopper.

9. The process of claim 8, wherein the chain stopper comprises the first reactive end group or the second reactive end group.

10. The process of claim 1, wherein the at least one organic solvent of the reaction mixture has a polarity index of greater than or equal to about 2.3 and a boiling point of greater than or equal to about 150° C.

11. The process of claim 1, wherein in step (j), the amount of part-moles of second reactive end group of the at least one second monomer or the amount of part-moles of the first reactive end group of the at least one first monomer is added within 4 hours after the sample is extracted from the reaction mixture.

12. The process of claim 11, wherein the addition is repeated from 1 to 4 times.

13. The process of claim 1, wherein the offset factor is determined by forming a polyetherimide; wherein the first reactive end group of the first monomer is an anhydride group and the second reactive end group of the second monomer is an amine group.

14. The process of claim 13, wherein $S_F$ ranges from −3 mole percent anhydride groups to +3 mole percent anhydride groups.

15. The process of claim 13, wherein $S_F$ ranges from +0.3 mole percent anhydride groups to +0.7 mole percent anhydride groups.

16. A process for preparing a polyimide sulfone resin with interim correction for reaction stoichiometry to achieve a predetermined target stoichiometry comprising the steps of:

(a) selecting a polymer target stoichiometry, $S_T$, based on target incorporated part-moles of anhydride groups of an aromatic dianhydride monomer, $A_T$, and target incorporated part-moles amine groups of aromatic diamine monomer, $B_T$, wherein at least one of the monomers comprises a sulfone linkage and wherein $$S_T = [A_T/B_T] - 1;$$

(b) calculating an initial polymer formulation stoichiometry, $S_I$, by determining an offset factor, λ, and calculating the polymer formulation stoichiometry based on the formula:

$$S_I = S_T + \lambda,$$

wherein the offset factor is determined by experimentally determining an amount of a member selected from the group consisting of unreacted aromatic dianhydride monomers, unreacted aromatic diamine monomer, and combinations thereof, of a calibration sample thermoplastic polymer made by reacting aromatic dianhydride monomers and aromatic diamine monomers;

(c) determining part-moles of anhydride groups of the aromatic dianhydride to be added to a reactor, $A_I$, and part-moles of amine groups of the aromatic diamine to be added to the reactor, $B_I$, based on the following formula $$S_T = [A_I/B_I] - 1;$$

(d) reacting the amount of the aromatic dianhydride and the amount of the aromatic diamine determined from step (c) in the reactor containing at least one organic solvent and forming a reaction mixture having solids in an amount that is more than are more than 5 weight percent, based on the weight of the reaction mixture;

(e) obtaining a sample from the reaction mixture after a period of time sufficient to allow for reaction of the aromatic dianhydride and the aromatic diamine to form the polyimide sulfone resin;

(f) separating the sample into a soluble phase and an insoluble phase comprising polyimide sulfone resin;

(g) determining an anhydride group concentration in the polyimide sulfone resin of insoluble phase as measured in part-moles ($A_R$), an amine group concentration in the polyimide sulfone resin of the insoluble phase as measured in part-moles ($B_R$), an anhydride group concentration in the soluble phase as measured in part-moles ($X_R$), and an amine group concentration in the soluble phase as measured in part-moles ($Y_R$);

(h) determining a reaction stoichiometry for the sample, $S_R$, based on the following formula:

$$S_R = [A_R/B_R] - 1;$$

(i) determining the value of $S_T - S_R$;

(j) selecting from, (i) if $S_T - S_R \leq 0$, adding to the reaction an amount of part-moles of amine groups based on the formula:

$$B_C = \alpha * B_I \left( \frac{1+S_R}{1+S_T} - 1 \right) + \beta * X_R,$$

wherein $B_C$ is part-moles of amine groups of the aromatic diamine for addition to the reaction, $B_I$ is the part-moles of amine groups of the aromatic diamine initially charged to the reactor, $S_R$ is the reaction stoichiometry for the sample, $S_T$ is the polymer target stoichiometry, $X_R$ is part-moles of anhydride groups of the aromatic dianhydride in the soluble phase of the sample, $\alpha$ is constant ranging from 1 to 20; $\beta$ is a constant ranging from 0 to 1; or (ii) if $S_T - S_R > 0$, adding to the reaction an amount of part-moles of anhydride group based on the following formula:

$$A_C = B_I * \delta(S_T - S_R) + \epsilon Y_R$$

wherein $A_C$ is part moles of anhydride groups of the aromatic dianhydride for addition to the reaction, $B_I$ is part-moles of amine groups of the aromatic diamine initially charged to the reactor, $S_R$ is the reaction stoichiometry for the sample, $S_T$ is the polymer target stoichiometry, $Y_R$ is part-moles of amine groups of the aromatic diamine in the soluble phase of the sample, $\delta$ is a constant ranging from 1 to 20, and $\epsilon$ is a constant ranging from 0 to 1; and (k) forming the polyimide sulfone resin with a final stoichiometry, $S_F$.

17. The process of claim 16, wherein $S_F$ ranges from −3 mole percent anhydride groups to +3 mole percent anhydride groups.

18. The process of claim 16, wherein $S_F$ ranges from +0.3 mole percent anhydride groups to +0.7 mole percent anhydride groups.

19. The process of claim 16, wherein the polyimide sulfone is formed having a glass transition temperature of from about 200 to about 350° C., a residual volatile species concentration of less than about 500 ppm, and a reactive end group concentration of less than or equal to the target stoichiometry.

20. The process of claim 16, wherein the polyimide sulfone is further made with an additional monomer comprising anhydride groups or amine groups and the part-moles determinations further comprise the part-moles of anhydride groups or amine groups in the additional monomer.

21. The process of claim 20, wherein the additional monomer is a chain stopper selected from the group consisting of aromatic mono-carboxylic acid anhydrides, monoamines, and combinations thereof.

22. The process of claim 21, wherein step (a) the reaction components comprise 4,4' oxydiphthalic anhydride, 4,4'-diaminodiphenylsulfone, and aniline.

23. The process of claim 21, wherein step (a) the reaction components comprise 4,4' oxydiphthalic anhydride, 4,4'-diaminodiphenylsulfone, and phthalic anhydride.

24. The process of claim 16, wherein $\lambda$ ranges from 0.0001 to 1.

25. The process of claim 16, wherein in the reaction is conducted at a pressure of 0.1 atm to 10 atm.

26. The process of claim 16, wherein the reaction is conducted at a pressure of 1.0 atm to 3.0 atm.

* * * * *